US012587761B2

(12) United States Patent
Sakurabu

(10) Patent No.: US 12,587,761 B2
(45) Date of Patent: Mar. 24, 2026

(54) IMAGING APPARATUS, DRIVE METHOD OF IMAGING APPARATUS, AND PROGRAM

(71) Applicant: FUJIFILM Corporation, Tokyo (JP)

(72) Inventor: Hitoshi Sakurabu, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 228 days.

(21) Appl. No.: 18/437,588

(22) Filed: Feb. 9, 2024

(65) Prior Publication Data

US 2024/0187753 A1 Jun. 6, 2024

Related U.S. Application Data

(63) Continuation of application No. PCT/JP2022/027037, filed on Jul. 8, 2022.

(30) Foreign Application Priority Data

Aug. 25, 2021 (JP) ................................. 2021-137513

(51) Int. Cl.
*H04N 25/704* (2023.01)
*H04N 25/42* (2023.01)
(52) U.S. Cl.
CPC ........... *H04N 25/704* (2023.01); *H04N 25/42* (2023.01)
(58) Field of Classification Search
CPC .... H04N 25/704; H04N 25/42; H04N 25/134; G02B 7/28; G02B 7/34; G03B 13/36
See application file for complete search history.

(56) References Cited

U.S. PATENT DOCUMENTS

2015/0244929 A1* 8/2015 Lee ...................... H04N 23/633
348/346
2020/0304723 A1* 9/2020 Okiyama ............... H04N 23/76
(Continued)

FOREIGN PATENT DOCUMENTS

JP S59-9610 A 1/1984
JP 2000-089098 A 3/2000
(Continued)

OTHER PUBLICATIONS

International Search Report issued in PCT/JP2022/027037; mailed Sep. 13, 2022.
(Continued)

*Primary Examiner* — Shahbaz Nazrul
(74) *Attorney, Agent, or Firm* — Studebaker Brackett PLLC

(57) ABSTRACT

There is provided an imaging apparatus configured to: execute a first mode that is a mode related to focusing on a subject and in which focusing information of a first region is acquired by performing a first shift operation on first phase difference information, which is obtained from a first phase difference pixel group within the first region, and second phase difference information, which is obtained from a second phase difference pixel group within the first region; and execute a second mode that is a mode different from the first mode and in which distance information of a second region larger than the first region is acquired by performing a second shift operation on the first phase difference information and the second phase difference information corresponding to the second region, and a shift range in the second shift operation is smaller than a shift range in the first shift operation.

11 Claims, 13 Drawing Sheets

(56)  References Cited

U.S. PATENT DOCUMENTS

2022/0132043 A1*   4/2022   Park ..................... H04N 17/002
2025/0203199 A1*   6/2025   Takeshita ............... G03B 13/18

FOREIGN PATENT DOCUMENTS

JP         2016-148823 A      8/2016
JP         2018-017876 A      2/2018
JP         2020-191624 A      11/2020
WO         2019/026923 A1     2/2019

OTHER PUBLICATIONS

Written Opinion of the International Searching Authority issued in
PCT/JP2022/027037; mailed Sep. 13, 2022.
An Office Action, "Notice of Reasons for Refusal," mailed by the
Japanese Patent Office on Dec. 9, 2025, which Corresponds to
Japanese Patent Application No. 2023-543737 and is related to U.S.
Appl. No. 18/437,588; with English language translation.

* cited by examiner

FIG. 5

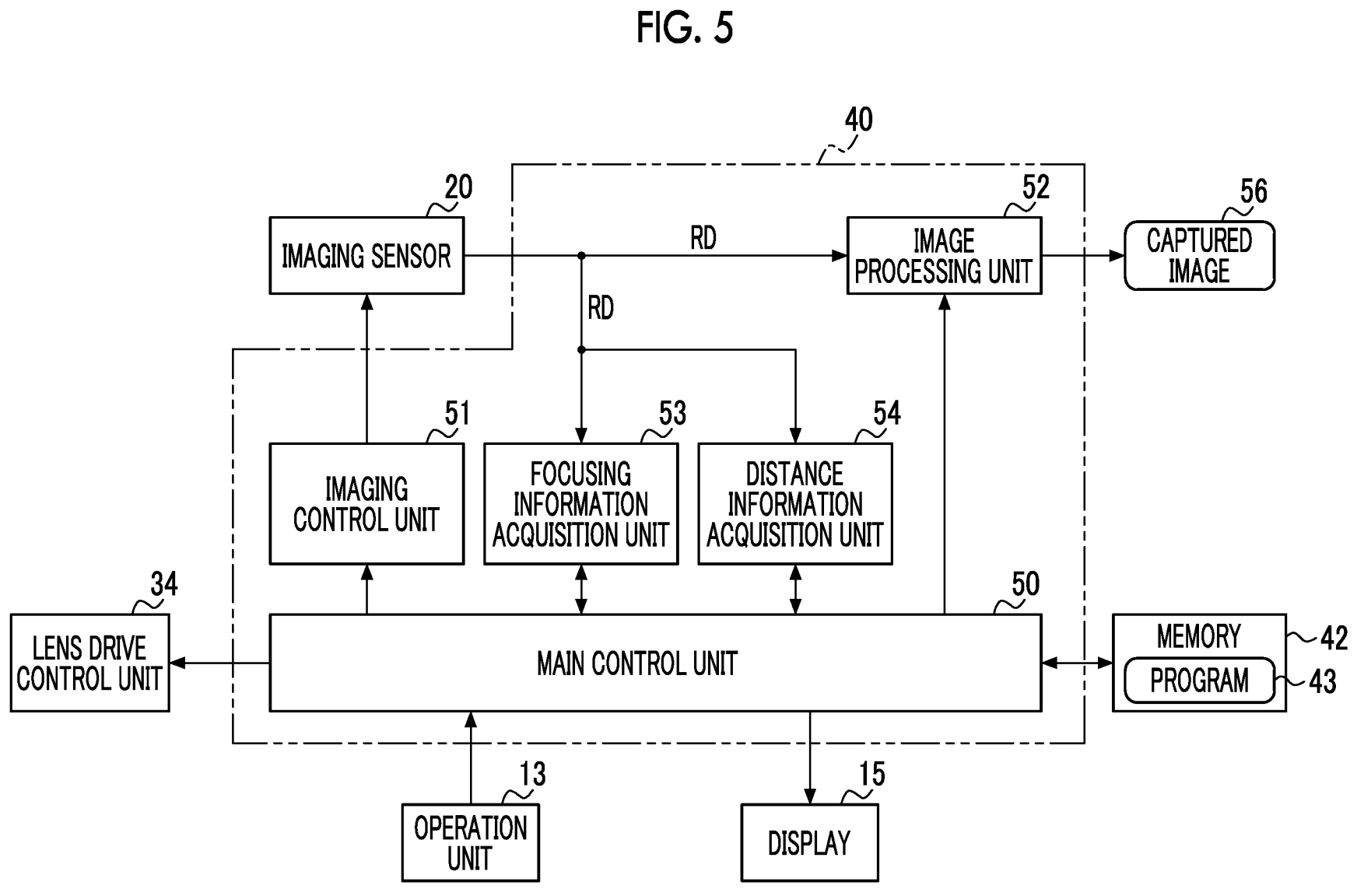

MEMORY 42
PROGRAM 43

CAPTURED IMAGE 56

IMAGE PROCESSING UNIT 52

40

RD

DISTANCE INFORMATION ACQUISITION UNIT 54

RD

FOCUSING INFORMATION ACQUISITION UNIT 53

IMAGING SENSOR 20

IMAGING CONTROL UNIT 51

MAIN CONTROL UNIT 50

DISPLAY 15

OPERATION UNIT 13

LENS DRIVE CONTROL UNIT 34

COLOR
ASSIGNMENT

80

COLOR CHART
δ
1.0
0.5
0
−0.5
−1.0

72

Y

X

90

H

IMAGING APPARATUS, DRIVE METHOD OF IMAGING APPARATUS, AND PROGRAM

CROSS-REFERENCE TO RELATED APPLICATION

This application is a continuation application of International Application No. PCT/JP2022/027037, filed Jul. 8, 2022, the disclosure of which is incorporated herein by reference in its entirety. Further, this application claims priority from Japanese Patent Application No. 2021-137513 filed on Aug. 25, 2021, the disclosure of which is incorporated herein by reference in its entirety.

BACKGROUND

1. Technical Field

The technology of the present disclosure relates to an imaging apparatus, a drive method of an imaging apparatus, and a program.

2. Description of the Related Art

JP2018-017876A discloses an imaging apparatus including: a focus detection unit that detects a defocus amount for each of a plurality of predetermined focus detection regions from an image signal output from an imaging element; a creation unit that creates distance distribution information based on the defocus amount; a focus adjustment unit that performs focus adjustment based on the distance distribution information and the defocus amount; and a control unit that performs control to perform imaging by setting a stop provided in an imaging optical system to a first F number, which is a predetermined first depth of field, in a case where the distance distribution information is created by the creation unit, and to perform imaging by setting the stop to a second F number, which is a second depth of field shallower than the first depth of field, in a case where the focus adjustment is performed by the focus adjustment unit.

JP2000-089098A discloses a multi-point distance-measuring device that reduces a time required for distance measurement operations by reducing the number of shifts of shift operations for a distance measurement area located outside a center of an imaging area of a distance-measuring sensor as compared with the number of shifts of shift operations for a distance measurement area set at the center of the imaging area in a case where shift operations for obtaining distance measurement data in a plurality of distance measurement areas set within the imaging area is executed by a microcomputer.

JP2020-191624A discloses an electronic apparatus comprising: an imaging unit that captures a parallax image; a first generation unit that generates a viewing image from the parallax image captured by the imaging unit; a second generation unit that generates a distance image from the parallax image captured by the imaging unit; a measurement unit that uses the distance image to acquire measurement information regarding a subject in the viewing image; and an assist unit that assists in setting an imaging condition of the imaging unit based on the viewing image or a parallax image for a viewing image in order to capture a parallax image for a distance image used in generating the distance image through the second generation unit by using the imaging unit after the parallax image for a viewing image used in generating the viewing image through the first generation unit is acquired, or assists in setting an imaging condition of the imaging unit based on the distance image or the parallax image for a distance image in order to perform imaging in an opposite order.

SUMMARY

One embodiment according to the technology of the present disclosure provides an imaging apparatus, a drive method of an imaging apparatus, and a program that enable rapid acquisition of distance information.

In order to achieve the above-described object, according to the present disclosure, there is provided an imaging apparatus comprising: an image sensor that has a phase difference pixel group including a first phase difference pixel group and a second phase difference pixel group; and at least one processor, in which the processor is configured to: execute a first mode that is a mode related to focusing on a subject and in which focusing information of a first region is acquired by performing a first shift operation on first phase difference information, which is obtained from the first phase difference pixel group within the first region, and second phase difference information, which is obtained from the second phase difference pixel group within the first region; and execute a second mode that is a mode different from the first mode and in which distance information of a second region larger than the first region is acquired by performing a second shift operation on the first phase difference information and the second phase difference information corresponding to the second region, and a shift range in the second shift operation is smaller than a shift range in the first shift operation.

It is preferable that the second region includes a region of the subject that is in focus.

It is preferable that the second shift operation has a larger information amount of the first phase difference information and the second phase difference information than the first shift operation.

It is preferable that the processor is configured to, in the second mode: acquire the first phase difference information and the second phase difference information by encoding signals obtained from the first phase difference pixel group and the second phase difference pixel group.

It is preferable that the processor is configured to, in the second mode: convert the signal obtained from the first phase difference pixel group into the first phase difference information by using a local binary encoding method; convert the signal obtained from the second phase difference pixel group into the second phase difference information by using the local binary encoding method; and perform a bitwise operation on the first phase difference information and the second phase difference information as the second shift operation to acquire the distance information including a plurality of pixels, which is represented by a result of the bitwise operation.

It is preferable that the processor is configured to, in the second mode: generate a phase difference image based on the signals obtained from the first phase difference pixel group and the second phase difference pixel group.

It is preferable that the processor is configured to, in the second mode: generate the first phase difference information and the second phase difference information based on the signals obtained from the first phase difference pixel group and the second phase difference pixel group; and generate a distance map that represents a distance to be visually identifiable by a user, based on the result of the bitwise operation.

It is preferable that the processor is configured to, in the second mode: control the second shift operation based on an image structure of the subject.

It is preferable that the image structure of the subject is a contour of the subject.

According to the present disclosure, there is provided a drive method of an imaging apparatus including an image sensor that has a phase difference pixel group including a first phase difference pixel group and a second phase difference pixel group, the drive method comprising: executing a first mode that is a mode related to focusing on a subject and in which focusing information of a first region is acquired by performing a first shift operation on first phase difference information, which is obtained from the first phase difference pixel group within the first region, and second phase difference information, which is obtained from the second phase difference pixel group within the first region; and executing a second mode that is a mode different from the first mode and in which distance information of a second region larger than the first region is acquired by performing a second shift operation on the first phase difference information and the second phase difference information corresponding to the second region, in which a shift range in the second shift operation is smaller than a shift range in the first shift operation.

According to the present disclosure, there is provided a program for operating an imaging apparatus including an image sensor that has a phase difference pixel group including a first phase difference pixel group and a second phase difference pixel group, the program configured to: cause the imaging apparatus to execute a first mode that is a mode related to focusing on a subject and in which focusing information of a first region is acquired by performing a first shift operation on first phase difference information, which is obtained from the first phase difference pixel group within the first region, and second phase difference information, which is obtained from the second phase difference pixel group within the first region; and cause the imaging apparatus to execute a second mode that is a mode different from the first mode and in which distance information of a second region larger than the first region is acquired by performing a second shift operation on the first phase difference information and the second phase difference information corresponding to the second region, in which a shift range in the second shift operation is smaller than a shift range in the first shift operation.

BRIEF DESCRIPTION OF THE DRAWINGS

Exemplary embodiments according to the technique of the present disclosure will be described in detail based on the following figures, wherein:

FIG. 5 is a block diagram showing an example of a functional configuration of a processor, FIG. 6 is a diagram conceptually showing an example of focusing information acquisition processing.

DETAILED DESCRIPTION

An example of an embodiment according to the technology of the present disclosure will be described with reference to the accompanying drawings.

First, the terms used in the following description will be described.

In the following description, "IC" is an abbreviation of "integrated circuit". "CPU" is an abbreviation of "central processing unit". "ROM" is an abbreviation of "read only memory". "RAM" is an abbreviation of "random access memory". "CMOS" is an abbreviation of "complementary metal oxide semiconductor".

"FPGA" is an abbreviation of "field programmable gate array". "PLD" is an abbreviation of "programmable logic device". "ASIC" is an abbreviation of "application specific integrated circuit". "OVF" is an abbreviation of "optical view finder". "EVF" is an abbreviation of "electronic view finder". "JPEG" is an abbreviation of "joint photographic experts group". "AF" is an abbreviation of "auto focus". "MF" is an abbreviation of "manual focus". "LBE" is an abbreviation of "local binary encoding". "LBP" is an abbreviation of "local binary pattern".

As an embodiment of an imaging apparatus, the technology of the present disclosure will be described by using a lens-interchangeable digital camera as an example. It should be noted that the technology of the present disclosure is not limited to the lens-interchangeable type and can also be applied to a digital camera with an integrated lens.

Figure 1:
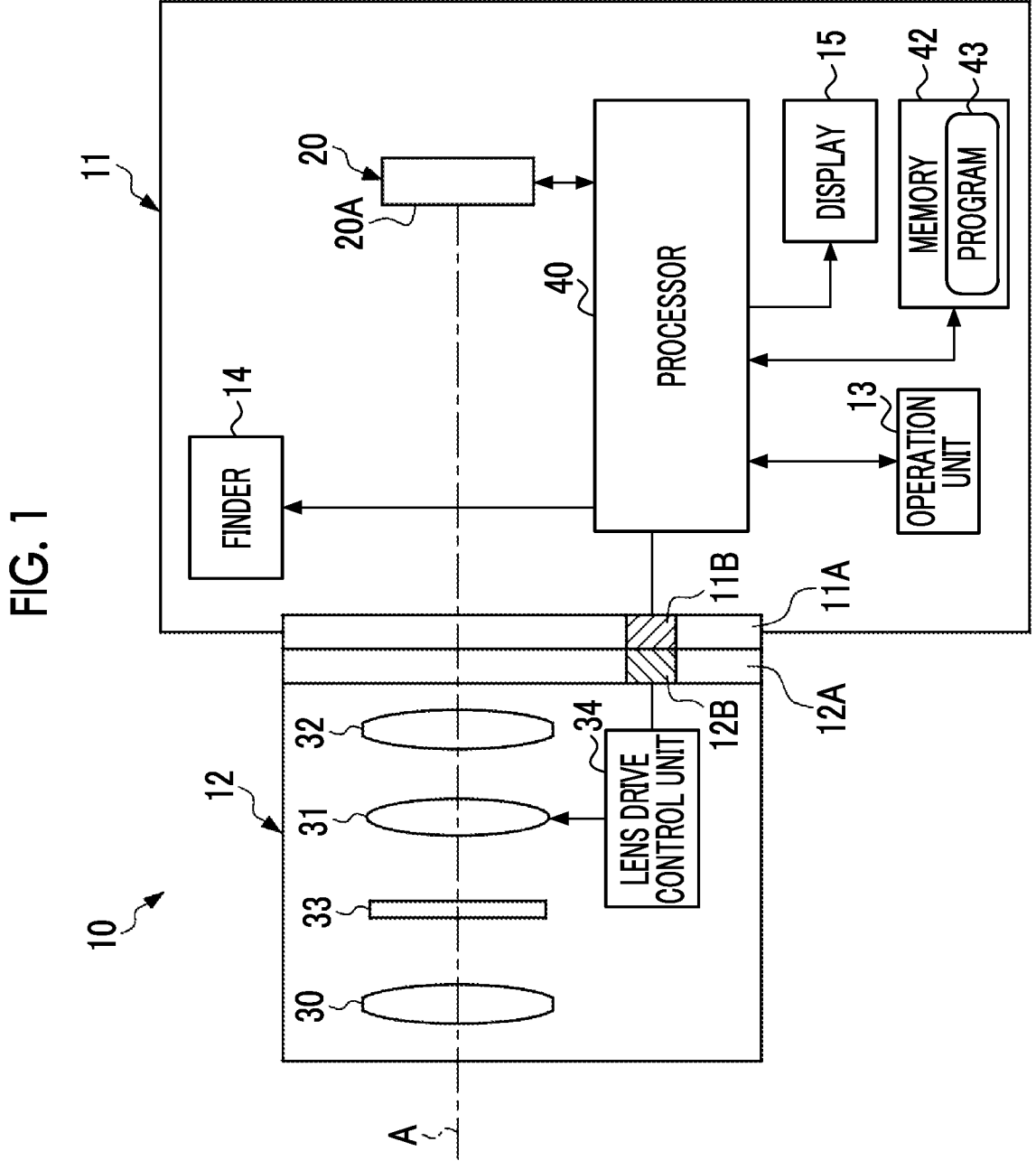
FIG. 1 is a diagram showing an example of an internal configuration of an imaging apparatus.

FIG. 1 shows an example of a configuration of an imaging apparatus 10. The imaging apparatus 10 is a lens-interchangeable digital camera. The imaging apparatus 10 is composed of a body 11 and an imaging lens 12 that is interchangeably mounted on the body 11. The imaging lens 12 is attached to a front surface side of the body 11 via a camera-side mount 11A and a lens-side mount 12A.

The body 11 is provided with an operation unit 13 including a dial, a release button, and the like. Examples of an operation mode of the imaging apparatus 10 include a still image capturing mode, a video capturing mode, and an image display mode. The operation unit 13 is operated by a user in a case of setting the operation mode. In addition, the operation unit 13 is operated by the user in a case of starting the execution of still image capturing or video capturing.

Further, the operation mode includes an auto focus (AF) mode and a manual focus (MF) mode. In the AF mode, a focusing information acquisition mode for acquiring focusing information of a subject is executed. In the MF mode, a distance information acquisition mode for acquiring distance information of the subject is executed. In the MF mode, the user can perform focus adjustment while referring to the distance information. The manual focus is performed, for example, by operating a focus ring (not shown) provided on the imaging lens 12.

The focusing information acquisition mode is an example of a "first mode" according to the present disclosure. The distance information acquisition mode is an example of a "second mode" according to the present disclosure. The AF mode and the MF mode are selected by the user through the operation of the operation unit 13.

In addition, the body 11 is provided with a finder 14. Here, the finder 14 is a hybrid finder (registered trademark). The hybrid finder refers to a finder in which, for example, an optical view finder (hereinafter, referred to as "OVF") and an electronic view finder (hereinafter, referred to as "EVF") are selectively used. The user can observe an optical image or a live view image of the subject projected onto the finder 14 via a finder eyepiece portion (not shown).

Further, a display 15 is provided on a rear surface side of the body 11. The display 15 displays an image based on an image signal obtained through imaging, various menu screens, or the like.

The body 11 and the imaging lens 12 are electrically connected to each other by bringing an electrical contact 11B provided on the camera-side mount 11A into contact with an electrical contact 12B provided on the lens-side mount 12A.

The imaging lens 12 includes an objective lens 30, a focus lens 31, a rear-end lens 32, and a stop 33. Respective members are arranged in the order of the objective lens 30, the stop 33, the focus lens 31, and the rear-end lens 32 from an objective side along an optical axis A of the imaging lens 12. The objective lens 30, the focus lens 31, and the rear-end lens 32 constitute an imaging optical system. The type, the number, and the arrangement order of the lenses constituting the imaging optical system are not limited to the example shown in FIG. 1.

Additionally, the imaging lens 12 has a lens drive control unit 34. The lens drive control unit 34 is composed of, for example, a CPU, a RAM, a ROM, or the like. The lens drive control unit 34 is electrically connected to a processor 40 inside the body 11 via the electrical contact 12B and the electrical contact 11B.

The lens drive control unit 34 drives the focus lens 31 and the stop 33 based on a control signal transmitted from the processor 40. The lens drive control unit 34 performs drive control of the focus lens 31 based on a control signal for focusing control transmitted from the processor 40 in order to adjust a focusing position of the imaging lens 12. The processor 40 performs focus adjustment of a phase difference method.

The stop 33 has an opening in which an opening diameter is variable with the optical axis A as the center. The lens drive control unit 34 performs drive control of the stop 33 based on a control signal for stop adjustment transmitted from the processor 40 in order to adjust the amount of light incident on a light-receiving surface 20A of an imaging sensor 20.

Moreover, the imaging sensor 20, the processor 40, and a memory 42 are provided inside the body 11. The operations of the imaging sensor 20, the memory 42, the operation unit 13, the finder 14, and the display 15 are controlled by the processor 40.

The processor 40 is composed of, for example, a CPU, a RAM, a ROM, or the like. In such a case, the processor 40 executes various kinds of processing based on a program 43 stored in the memory 42. The processor 40 may be composed of an assembly of a plurality of IC chips.

The imaging sensor 20 is, for example, a CMOS-type image sensor. The imaging sensor 20 is disposed such that the optical axis A is orthogonal to the light-receiving surface 20A and the optical axis A is located at the center of the light-receiving surface 20A. Light (subject image) that has passed through the imaging lens 12 is incident on the light-receiving surface 20A. A plurality of pixels for generating an image signal by performing photoelectric conversion are formed on the light-receiving surface 20A. The imaging sensor 20 generates and outputs the image signal by photoelectrically converting light incident on each pixel. The imaging sensor 20 is an example of an "image sensor" according to the technology of the present disclosure.

In addition, a Bayer array color filter array is disposed on the light-receiving surface of the imaging sensor 20, and any of a red (R), green (G), or blue (B) color filter is disposed to face each pixel. Further, some of the plurality of pixels arranged on the light-receiving surface of the imaging sensor 20 are phase difference pixels for acquiring parallax information. The phase difference pixel is not provided with a color filter. Hereinafter, a pixel provided with the color filter is referred to as a normal pixel.

Figure 2:
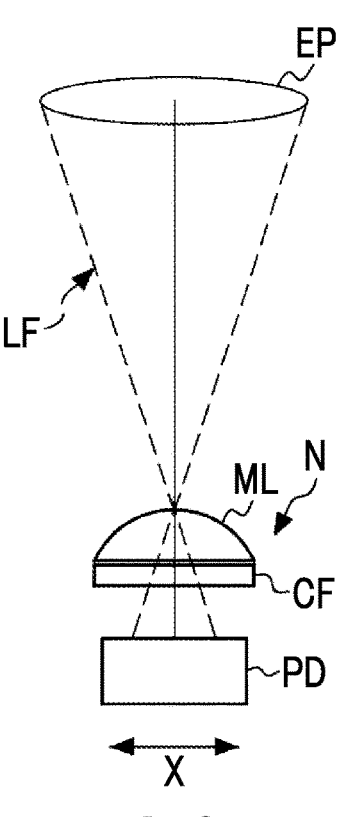
FIG. 2 is a diagram showing an example of a configuration of an imaging pixel.
Figure 3:
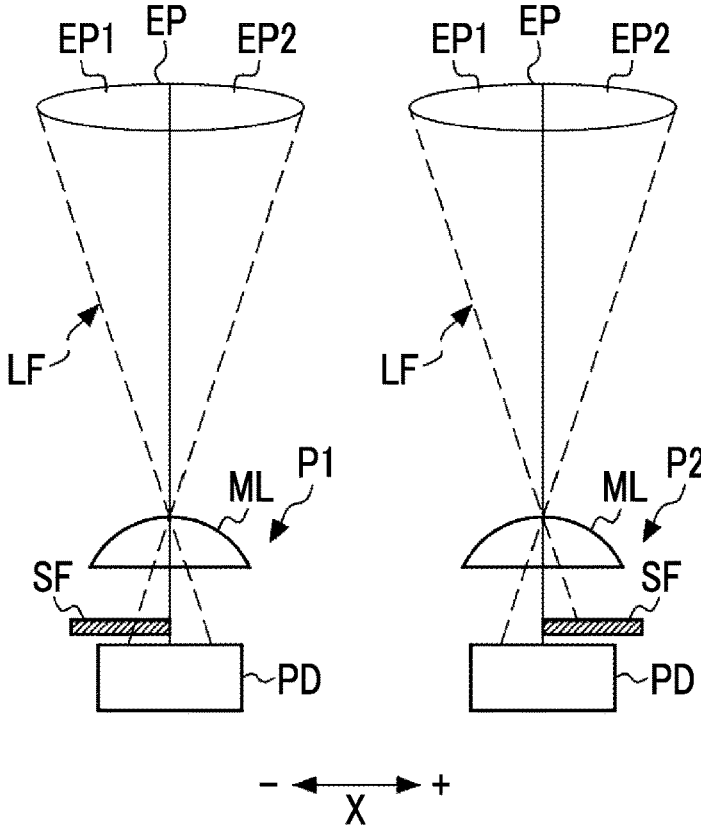
FIG. 3 is a diagram showing an example of a configuration of a phase difference pixel.

FIG. 2 shows an example of a configuration of an imaging pixel N. FIG. 3 shows an example of configurations of phase difference pixels P1 and P2. The phase difference pixels P1 and P2 each receive one of rays of luminous flux split in an X direction with a main light ray as the center.

As shown in FIG. 2, the imaging pixel N includes a photodiode PD as a photoelectric conversion element, a color filter CF, and a microlens ML. The color filter CF is disposed between the photodiode PD and the microlens ML.

The color filter CF is a filter that transmits light of any of R, G, or B. The microlens ML converges a luminous flux LF incident from an exit pupil EP of the imaging lens 12 to substantially the center of the photodiode PD via the color filter CF.

As shown in FIG. 3, the phase difference pixels P1 and P2 each include the photodiode PD, a light shielding layer SF, and the microlens ML. Similarly to the imaging pixel N, the microlens ML converges the luminous flux LF incident from the exit pupil EP of the imaging lens 12 to substantially the center of the photodiode PD.

The light shielding layer SF is formed of a metal film or the like and is disposed between the photodiode PD and the microlens ML. The light shielding layer SF blocks a part of the luminous flux LF incident on the photodiode PD via the microlens ML.

In the phase difference pixel P1, the light shielding layer SF blocks light from a negative side in the X direction with respect to the center of the photodiode PD as a reference. That is, in the phase difference pixel P1, the light shielding layer SF makes the luminous flux LF from a negative-side exit pupil EP1 incident on the photodiode PD and blocks the luminous flux LF from a positive-side exit pupil EP2 in the X direction.

In the phase difference pixel P2, the light shielding layer SF blocks light from a positive side in the X direction with respect to the center of the photodiode PD as a reference. That is, in the phase difference pixel P2, the light shielding layer SF makes the luminous flux LF from the positive-side exit pupil EP2 incident on the photodiode PD and blocks the luminous flux LF from the negative-side exit pupil EP1 in the X direction.

That is, the phase difference pixel P1 and the phase difference pixel P2 have different light shielding positions from each other. A plurality of the phase difference pixels P1 are an example of a "first phase difference pixel group" according to the technology of the present disclosure. In addition, a plurality of the phase difference pixels P2 are an example of a "second phase difference pixel group" according to the technology of the present disclosure.

Figure 4:
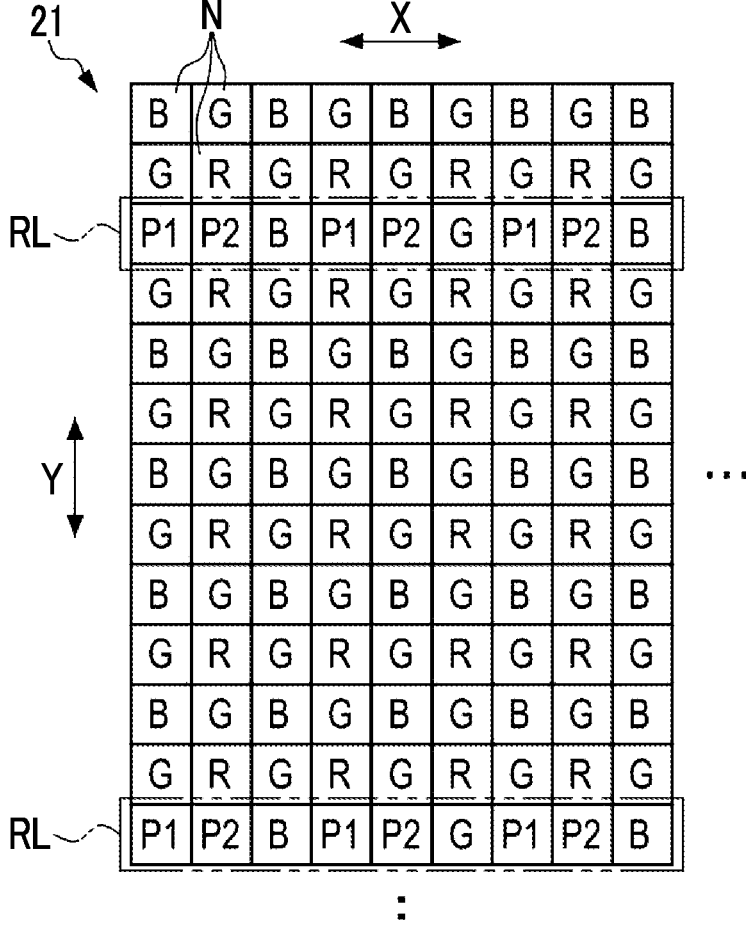
FIG. 4 is a diagram showing an example of pixel arrangement of an imaging sensor.

FIG. 4 shows an example of pixel arrangement of the imaging sensor 20. The "R" in FIG. 4 indicates the imaging pixel N provided with the color filter CF of R. The "G" indicates the imaging pixel N provided with the color filter CF of G. The "B" indicates the imaging pixel N provided with the color filter CF of B. The color array of the color filter CF is not limited to the Bayer array and may be another color array.

Rows RL including the phase difference pixels P1 and P2 are arranged every 10 pixels in a Y direction. In each row RL, a pair of phase difference pixels P1 and P2 and one imaging pixel N are repeatedly arranged in the X direction. An array pattern of the phase difference pixels P1 and P2 is not limited to the example shown in FIG. 4. For example, a pattern in which a plurality of phase difference pixels are disposed in one microlens ML as shown in FIG. 5 attached to JP2018-56703A may be employed.

FIG. 5 shows an example of a functional configuration of the processor 40. The processor 40 implements various functional units by executing processing in accordance with the program 43 stored in the memory 42. As shown in FIG. 5, in the processor 40, for example, a main control unit 50, an imaging control unit 51, an image processing unit 52, a focusing information acquisition unit 53, and a distance information acquisition unit 54 are implemented.

The main control unit 50 comprehensively controls an operation of the imaging apparatus 10 based on an instruction signal input through the operation unit 13. The imaging control unit 51 controls the imaging sensor 20 to execute imaging processing of causing the imaging sensor 20 to perform an imaging operation. The imaging control unit 51 drives the imaging sensor 20 in the still image capturing mode or the video capturing mode.

The image processing unit 52 generates a captured image 56 in a predetermined file format (for example, a JPEG format or the like) by performing various kinds of image processing on a RAW image RD output from the imaging sensor 20. The captured image 56 output from the image processing unit 52 is recorded in, for example, the memory 42. Additionally, the captured image 56 is output to the display 15 and displayed on the display 15. The captured image 56 is an image generated based on a signal output from the imaging pixel N.

The user can perform selection between the still image capturing mode and the video capturing mode by using the operation unit 13. The user can select the AF mode or the MF mode by operating the operation unit 13. In a case where the AF mode is selected, the main control unit 50 controls the position of the focus lens 31 based on the focusing information acquired by the focusing information acquisition unit 53. Further, in a case where the MF mode is selected, the main control unit 50 causes the display 15 to display the distance information acquired by the distance information acquisition unit 54 together with the captured image 56.

The focusing information acquisition unit 53 acquires the focusing information by performing a first shift operation based on signals output from the phase difference pixels P1 and P2 (see FIG. 4) within an AF area 60 (see FIG. 6) of the RAW image RD output from the imaging sensor 20. Acquiring the focusing information corresponds to detecting the position of the focus lens 31 where the focus is on the subject. The AF area is a region of the imaging sensor 20 where the subject to be focused, which is determined by the user or the imaging apparatus 10, is imaged.

The distance information acquisition unit 54 acquires the distance information by performing a second shift operation based on signals output from the phase difference pixels P1 and P2 (see FIG. 4) within an imaging area 62 of the RAW image RD output from the imaging sensor 20. The imaging area is an imaging area of the imaging sensor 20 and is larger than the AF area. The AF area is an example of a "first region" according to the technology of the present disclosure. The imaging area is an example of a "second region" according to the technology of the present disclosure.

Figure 6:
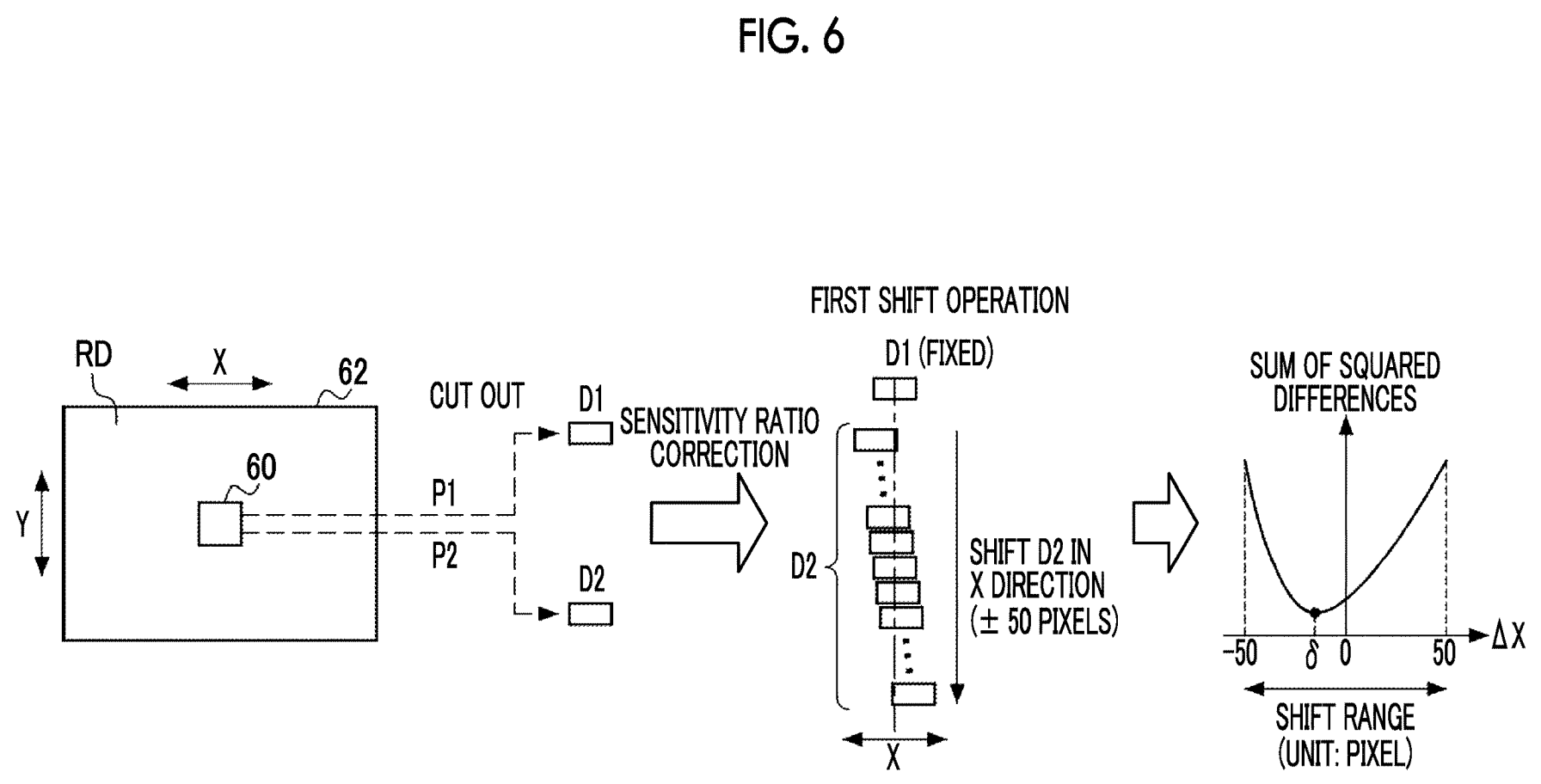

FIG. 6 conceptually shows an example of the focusing information acquisition processing performed by the focusing information acquisition unit 53. As shown in FIG. 6, the focusing information acquisition unit 53, based on the RAW image RD, acquires first phase difference information D1 from the plurality of phase difference pixels P1 included in the AF area 60 and acquires second phase difference information D2 from the plurality of phase difference pixels P2 included in the AF area 60. The first phase difference information D1 is composed of a pixel signal output from the phase difference pixel P1. The second phase difference information D2 is composed of a pixel signal output from the phase difference pixel P2.

A size of an angle of view of the AF area 60 is approximately 10% of the angle of view of the imaging area 62. The AF area 60 is set by the user through the operation using the operation unit 13, for example. The AF area 60 includes approximately 200 phase difference pixels P1 and approximately 200 phase difference pixels P2 in the X direction.

The focusing information acquisition unit 53 corrects a sensitivity ratio between the first phase difference information D1 and the second phase difference information D2, and then performs the first shift operation. The focusing information acquisition unit 53, in the first shift operation, fixes the first phase difference information D1, and calculates the sum of squared differences by performing correlation operations between the first phase difference information D1 and the second phase difference information D2 while shifting the second phase difference information D2 pixel by pixel in the X direction. The focusing information acquisition unit 53 calculates one sum of squared differences each time the second phase difference information D2 is shifted by one pixel.

A shift range in which the focusing information acquisition unit 53 shifts the second phase difference information D2 in the first shift operation is, for example, a range of $-50 \leq \Delta X \leq 50$. $\Delta X$ represents a shift amount in the X direction.

The focusing information acquisition unit 53 acquires, as the focusing information, a shift amount $\delta$ for which the sum of the squared differences is minimized (that is, the correlation value is maximized) in the shift range ($-50 \leq \Delta X \leq 50$). The shift amount $\delta$ represents a defocus amount.

The main control unit 50 moves the focus lens 31 based on the shift amount $\delta$ as the focusing information.

Figure 7:
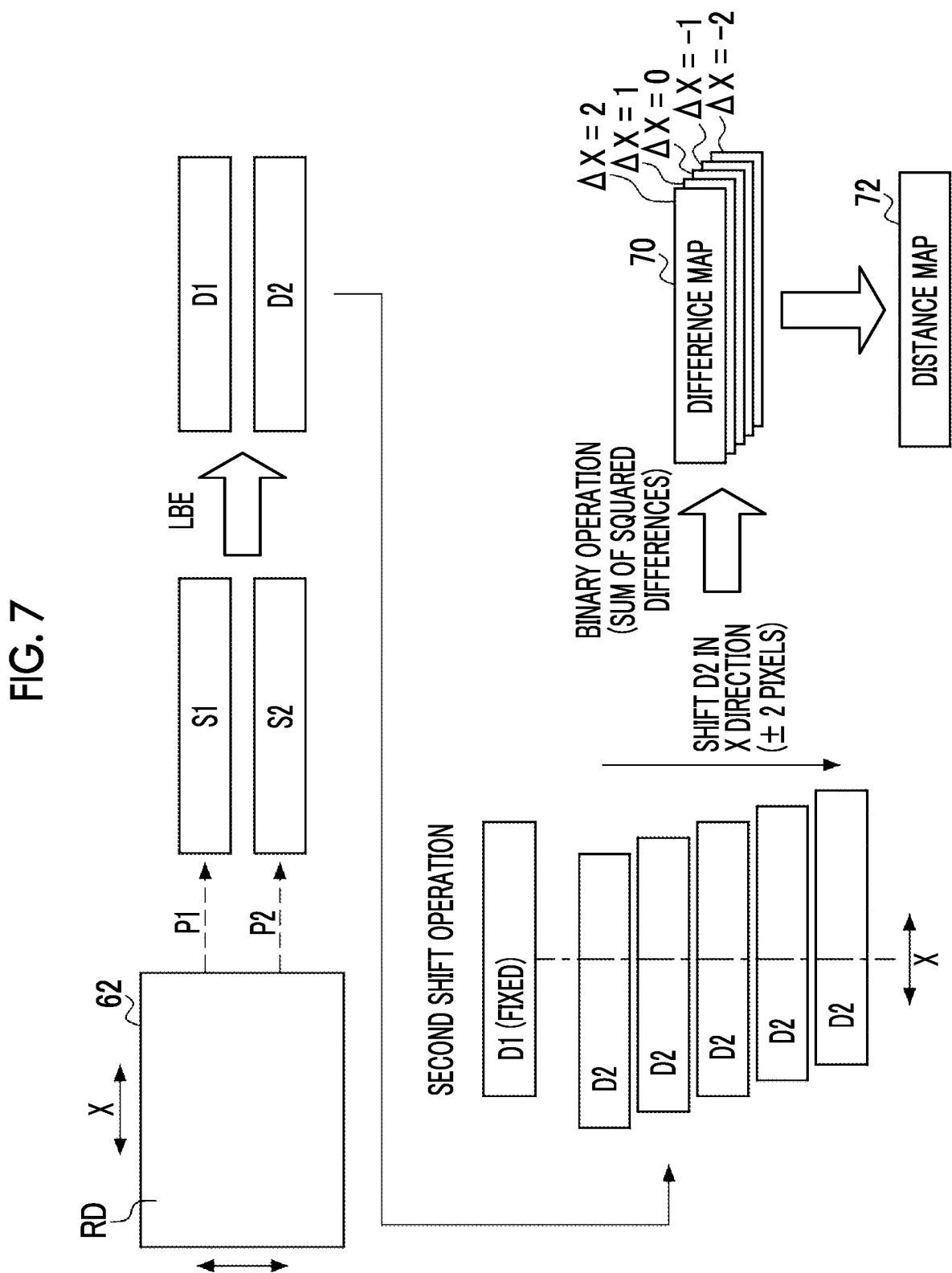
FIG. 7 is a diagram conceptually showing an example of distance information acquisition processing.

FIG. 7 conceptually shows an example of distance information acquisition processing performed by the distance information acquisition unit 54. As shown in FIG. 7, distance information acquisition unit 54, based on the RAW image RD, acquires a first signal S1 from the plurality of phase difference pixels P1 included in the imaging area 62 and acquires a second signal S2 from the plurality of phase difference pixels P2 included in the imaging area 62. The first signal S1 is composed of the pixel signal output from the phase difference pixel P1. The second signal S2 is composed of the pixel signal output from the phase difference pixel P2. The imaging area 62 includes approximately 2000 phase difference pixels P1 and approximately 2000 phase difference pixels P2 in the X direction.

The distance information acquisition unit 54 acquires the first phase difference information D1 and the second phase difference information D2 by encoding the first signal S1 and the second signal S2. The distance information acquisition unit 54 performs encoding by using a local binary encoding (LBE) method. Specifically, the distance information acquisition unit 54 converts the first signal S1 into the first phase difference information D1 by using the LBE method and converts the second signal S2 into the second phase difference information D2 by using the LBE method. The LBE method refers to a method of converting the phase difference information of each pixel or each pixel group into binary information in accordance with a predetermined criterion. In the second shift operation, each pixel of the first phase difference information D1 and the second phase difference information D2 is represented by a local binary pattern (hereinafter, referred to as LBP) of a binary number, which is encoded by the LBE method.

The distance information acquisition unit 54 performs the second shift operation by using the first phase difference information D1 and the second phase difference information D2. The distance information acquisition unit 54, in the second shift operation, fixes the first phase difference information D1, and calculates the sum of squared differences by performing correlation operations between the first phase difference information D1 and the second phase difference information D2 while shifting the second phase difference information D2 pixel by pixel in the X direction.

A shift range in which the distance information acquisition unit 54 shifts the second phase difference information D2 in the second shift operation is, for example, a range of $-2 \leq \Delta X \leq 2$. $\Delta X$ represents a shift amount in the X direction. That is, the shift range in the second shift operation is smaller than the shift range in the first shift operation. This is because the second shift operation targets the phase difference pixels P1 and P2 of the entire imaging area and has a larger information amount of the first phase difference information D1 and the second phase difference information D2 to be used than the first shift operation. In the second shift operation, the shift range is narrowed to increase a processing speed.

As will be described in detail below, the distance information acquisition unit 54 calculates the sum of squared differences by performing a binary operation. The distance information acquisition unit 54 performs the binary operation on the LBP included in the corresponding pixels of the first phase difference information D1 and the second phase difference information D2. The distance information acquisition unit 54 generates a difference map 70 by performing the binary operation each time the second phase difference information D2 is shifted by one pixel. As a result, the difference map 70 is generated for each of $\Delta X = 2, 1, 0, -1$, and $-2$. Each pixel of the difference map 70 is represented by an operation result of the binary operation.

In addition, as will be described in detail below, the distance information acquisition unit 54 generates a distance map 72 by performing processing such as sub-pixel interpolation based on a plurality of the difference maps 70. The main control unit 50 causes the display 15 to display the distance map 72.

Figure 8:
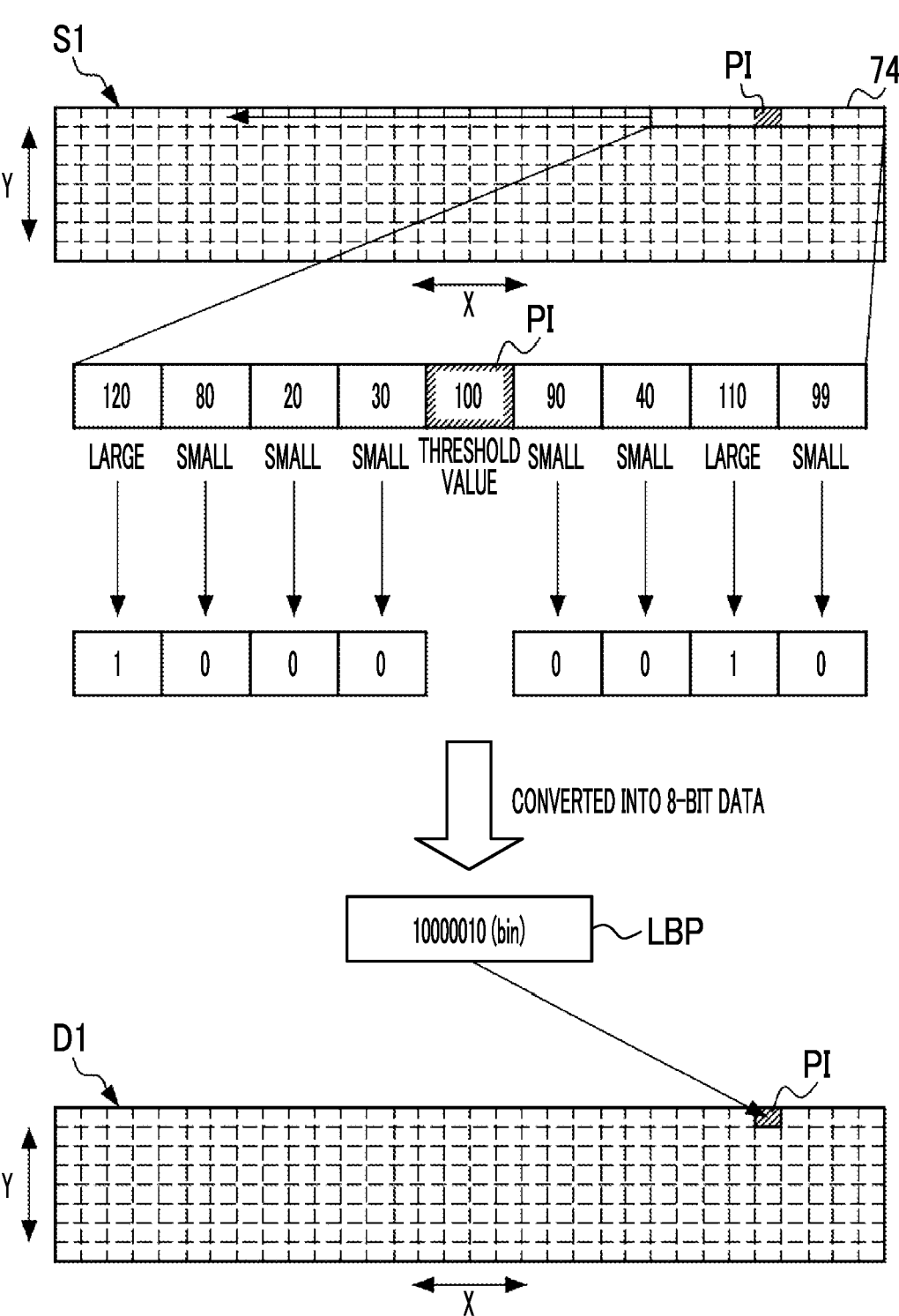
FIG. 8 is a diagram conceptually showing an example of encoding processing using an LBE method.

FIG. 8 conceptually shows an example of encoding processing using the LBE method. As shown in FIG. 8, an extraction region 74 is set in the first signal S1, and a plurality of pixel values are acquired from the set extraction region 74. The pixel value is a value of the pixel signal output from the phase difference pixel P1. For example, the extraction region 74 is a region including nine pixels arranged in the X direction. The size and the shape of the extraction region 74 can be changed as appropriate.

The distance information acquisition unit 54 sets a central pixel in the extraction region 74 as a pixel of interest P1 and sets a pixel value of the pixel of interest P1 as a threshold value. Next, the distance information acquisition unit 54 compares the value of a surrounding pixel with the threshold value, and assigns "1" in a case where the value of the surrounding pixel is equal to or greater than the threshold value, and assigns "0" in a case where the value of the surrounding pixel is less than the threshold value, thereby binarizing each value. Next, the distance information acquisition unit 54 converts the binarized values of the eight surrounding pixels into 8-bit data to form the LBP. Then, the distance information acquisition unit 54 replaces the value of the pixel of interest P1 with the LBP.

The distance information acquisition unit 54 generates the first phase difference information D1 by calculating the LBP while changing the extraction region 74 pixel by pixel and replacing the value of the pixel of interest P1 with the calculated LBP.

Since the encoding processing of generating the second phase difference information D2 is the same as the encoding processing of generating the first phase difference information D1, the description thereof will be omitted.

In this way, since each pixel of the first phase difference information D1 and the second phase difference information D2 used in the second shift operation processing is composed of an 8-bit LBP, the information amount is larger than the first phase difference information D1 and the second phase difference information D2 used in the first shift operation.

Figure 9:
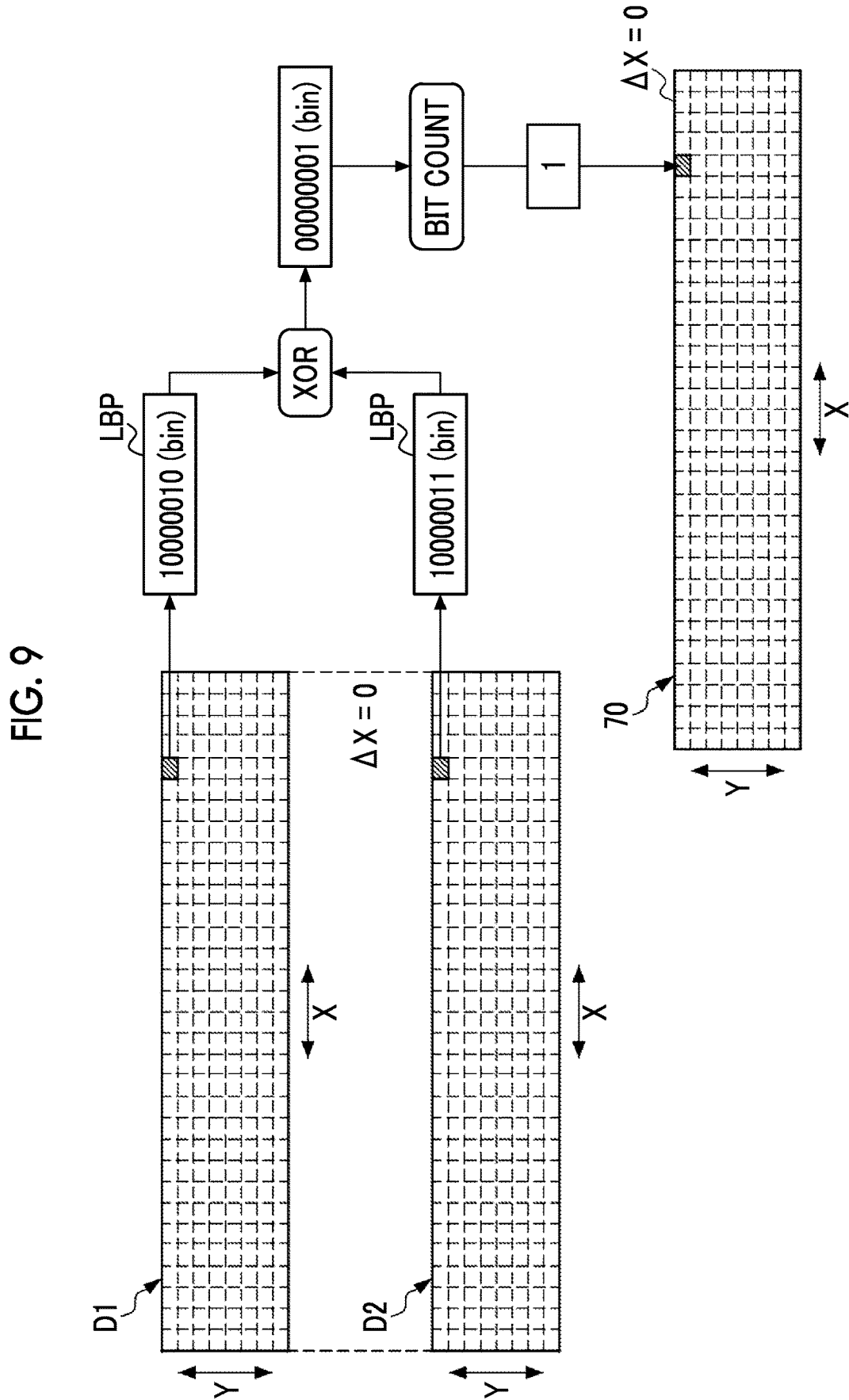
FIG. 9 is a diagram conceptually showing an example of second shift operation processing and shows a second shift operation in a case where $\Delta X=0$.
Figure 10:
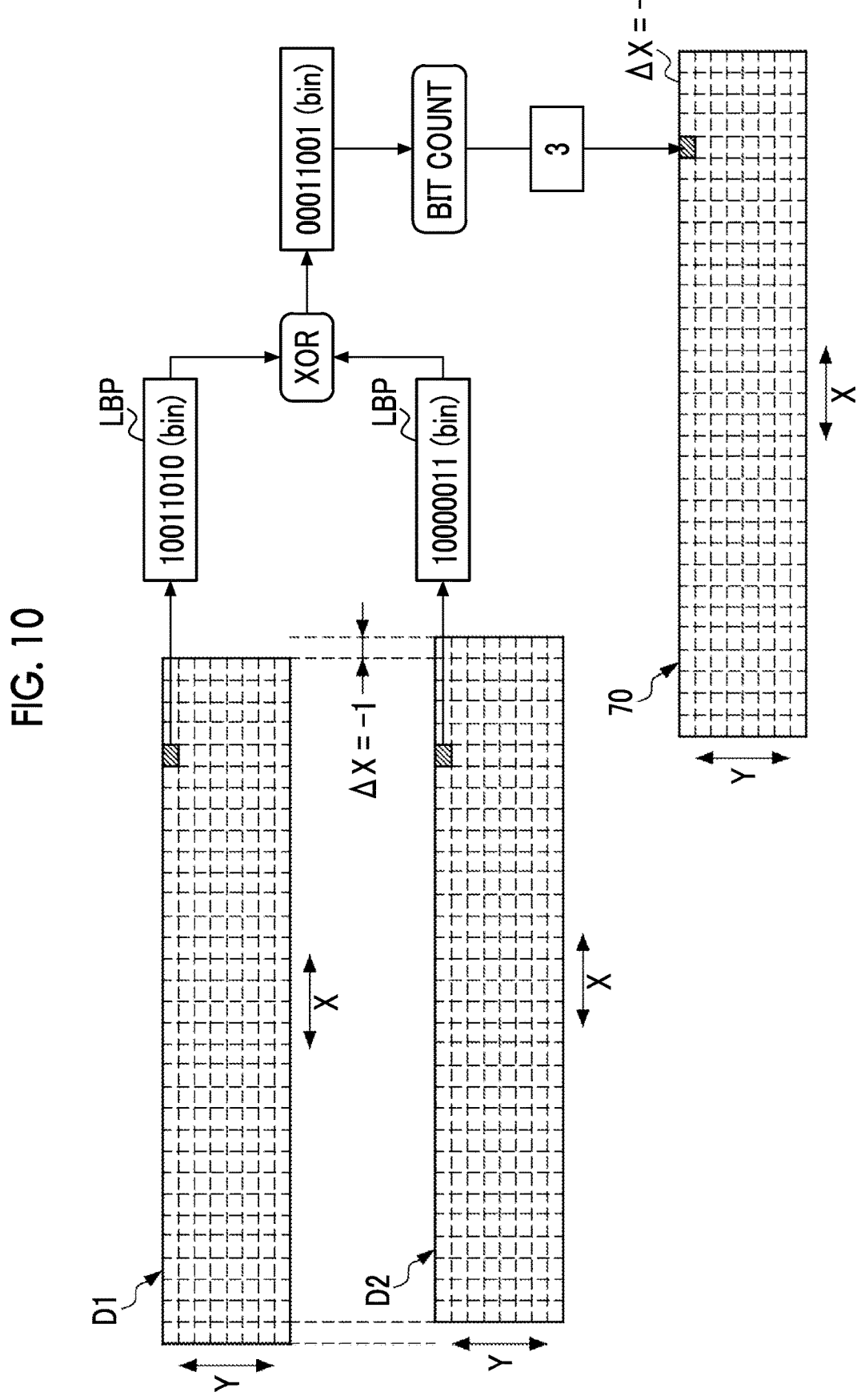
FIG. 10 is a diagram conceptually showing an example of the second shift operation processing and shows a second shift operation in a case where $\Delta X=-1$.

FIGS. 9 and 10 each conceptually show an example of second shift operation processing. FIG. 9 shows the second shift operation in a case where $\Delta X = 0$. FIG. 10 shows the second shift operation in a case where $\Delta X = -1$.

The distance information acquisition unit 54 reads out each of LBPs from the corresponding pixels of the first phase difference information D1 and the second phase difference information D2 and obtains the exclusive OR (XOR) of the two readout LBPs. Further, the distance information acquisition unit 54 performs bit count on the obtained exclusive OR. The bit count refers to counting "1" included in the exclusive OR represented in binary to obtain the number of "1s". Hereinafter, the value obtained through the bit count is referred to as a bit count value. In the present embodiment, the bit count value is a value within a range of 0 to 8.

The distance information acquisition unit 54 obtains the bit count value of the exclusive OR for each of $\Delta X = 2, 1, 0, -1$, and $-2$ in all the corresponding pixels of the first phase difference information D1 and the second phase difference information D2. As a result, the difference map 70 is generated for each of $\Delta X = 2, 1, 0, -1$, and $-2$. Each pixel of the difference map 70 is represented by the bit count value.

Figure 11:
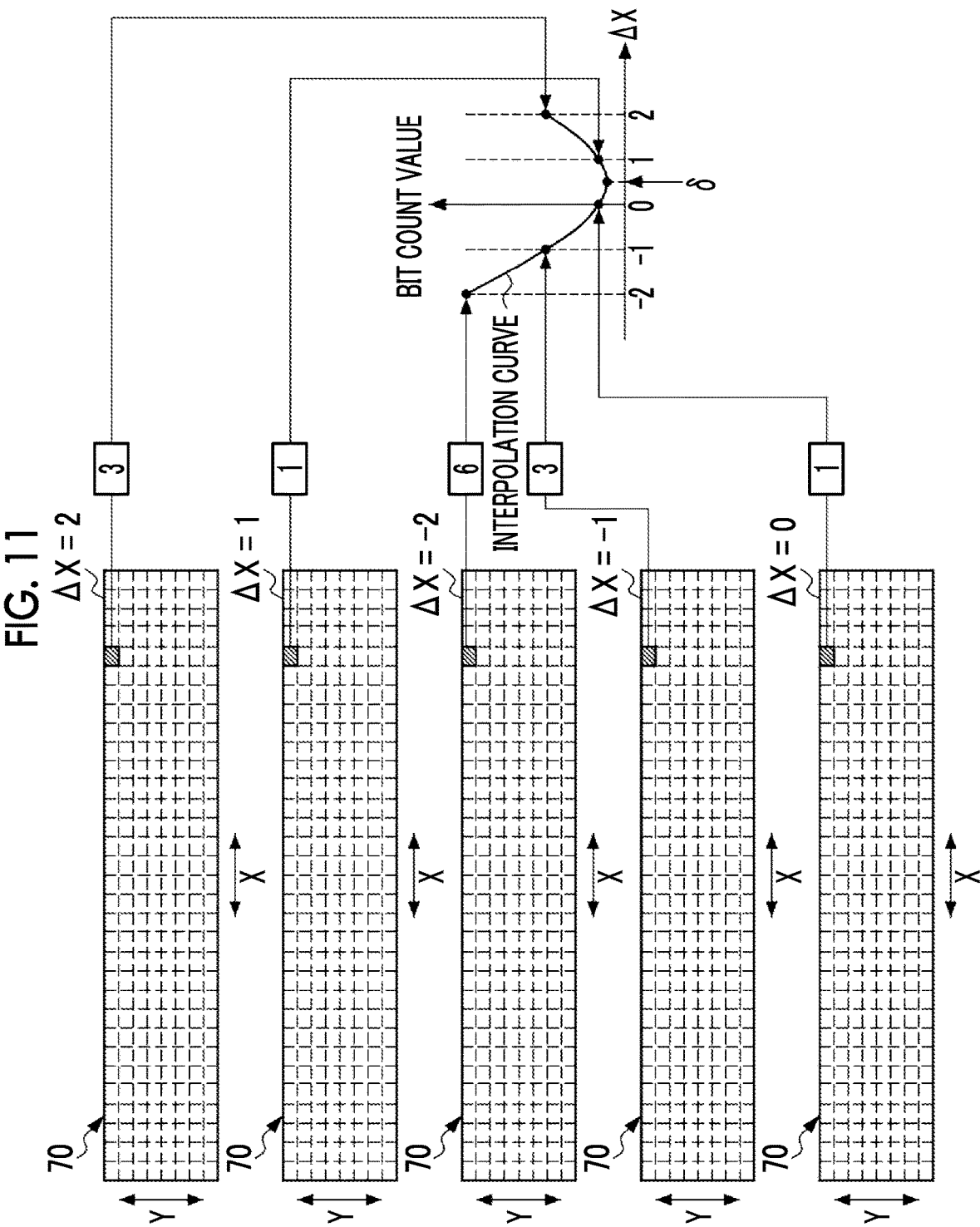
FIG. 11 is a diagram conceptually showing an example of sub-pixel interpolation processing.

FIG. 11 conceptually shows an example of sub-pixel interpolation processing. As shown in FIG. 11, the distance information acquisition unit 54 reads out the bit count values from the corresponding pixels of the plurality of difference maps 70 generated by the second shift operation processing and plots the readout bit count values into the shift amount ΔX. Then, the distance information acquisition unit 54 obtains a complementary curve by complementing the bit count values and obtains the shift amount δ with respect to a minimum value of the complementary curve. The shift amount δ represents a defocus amount, that is, a distance from a focusing position. A relationship between the shift amount δ and the actual distance depends on the depth of field. The shift amount δ is an example of a "result of a bitwise operation" according to the technology of the present disclosure.

Figures 12, 13:
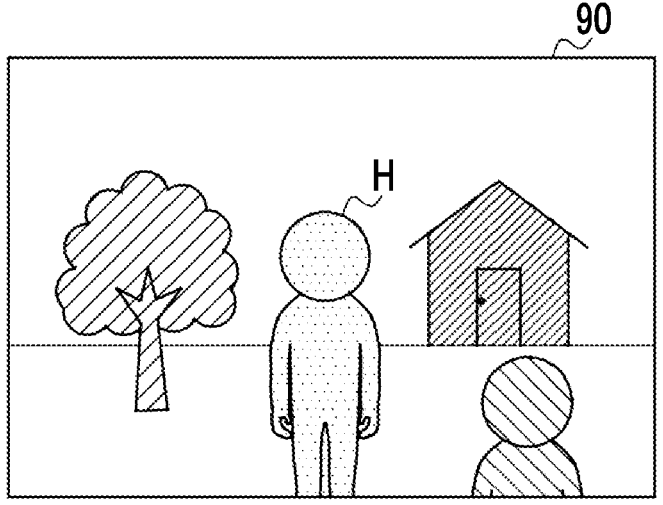
FIG. 12 is a diagram conceptually showing an example of color assignment processing.
FIG. 13 is a diagram schematically showing an example of a distance map.

FIG. 12 conceptually shows an example of color assignment processing. As shown in FIG. 12, the distance information acquisition unit 54 reads out a color corresponding to the shift amount δ obtained by the sub-pixel interpolation processing from a color chart 80 and assigns the readout color to the pixel at which the shift amount δ is obtained. The distance information acquisition unit 54 generates the distance map 72 by performing the color assignment processing on all the pixels included in the difference map 70.

The distance map 72 is distance information representing the shift amount δ, which is the result of the bitwise operation, for each pixel to be identifiable (that is, representing the distance to be visually identifiable by the user). The distance map 72 is a depth map representing a relative distance from the focusing position. The distance map 72 is an example of "distance information including a plurality of pixels, which is represented by a result of the bitwise operation" according to the technology of the present disclosure.

The distance information acquisition unit 54 may perform tint adjustment for the distance map 72 after generating the distance map 72 by performing the color assignment processing. In addition, the distance map 72 may be represented by the shift amount δ (that is, the defocus amount) without performing the color assignment processing. Further, the distance map 72 is not limited to the depth map representing a relative distance from the focusing position and may be represented by converting the distance into an absolute distance from the imaging sensor 20.

FIG. 13 schematically shows an example of the distance map 72. In the present embodiment, an object having a shift amount δ within a range of −1.0≤δ≤1.0 is colored and displayed on the distance map 72. The object outside the range of −1.0≤δ≤1.0 is represented in, for example, black.

In FIG. 13, it can be seen that a subject H is in an in-focus state (δ=0). That is, the imaging area 62 includes a focusing region of the subject that is in focus. The user can recognize a distance (that is, a defocus amount) to the object based on the color of the object shown in the distance map 72.

Figure 14:
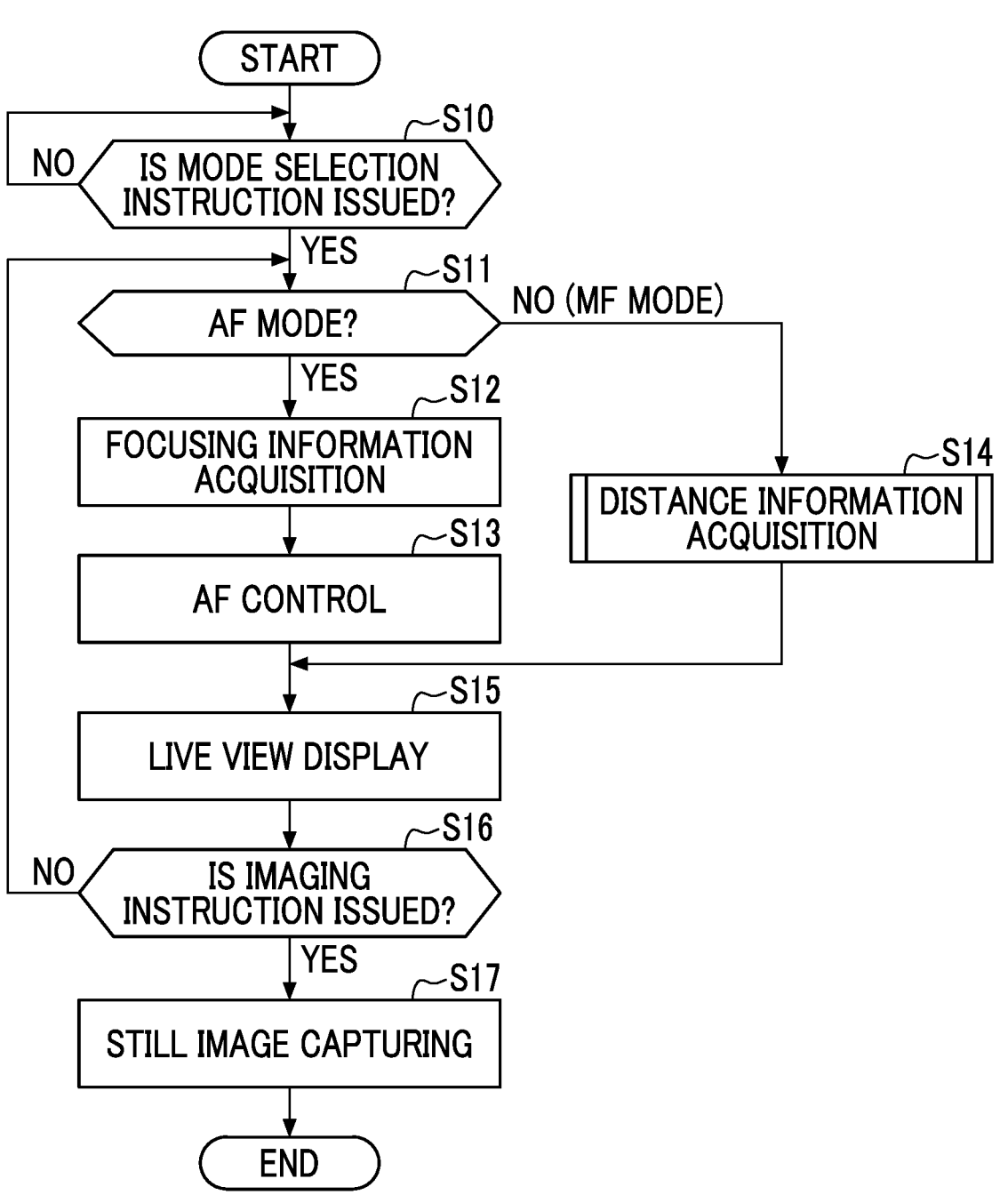
FIG. 14 is a flowchart showing an example of an operation of the imaging apparatus.

FIG. 14 is a flowchart showing an example of an operation of the imaging apparatus 10. FIG. 14 shows an example in which the still image capturing mode is selected.

The main control unit 50 determines whether or not an instruction (hereinafter, referred to as a mode selection instruction) to select the AF mode or the MF mode is issued by the user through the operation of the operation unit 13 (step S10). In a case where the mode selection instruction is issued (step S10: YES), the main control unit 50 determines whether or not the selected mode is the AF mode (step S11).

In a case where the main control unit 50 determines that the selected mode is the AF mode (step S11: YES), the main control unit 50 causes the focusing information acquisition unit 53 to execute the focusing information acquisition mode (step S12). In step S12, the focusing information acquisition unit 53 performs the above-described focusing information acquisition processing (see FIG. 6). Then, the main control unit 50 performs AF control based on the focusing information acquired by the focusing information acquisition unit 53 (step S13).

On the other hand, in a case where the main control unit 50 determines that the selected mode is not the AF mode (that is, the MF mode) (step S11: NO), the main control unit 50 causes the distance information acquisition unit 54 to execute the distance information acquisition mode (step S14). In step S14, the distance information acquisition unit 54 performs the above-described distance information acquisition processing (see FIGS. 7 to 13).

After step S13 or step S14, the main control unit 50 causes the display 15 to perform live view display (step S15). In the AF mode, the main control unit 50 causes the display 15 to display the captured image 56. In the MF mode, the main control unit 50 causes the display 15 to display the distance map 72.

Next, the main control unit 50 determines whether or not an imaging instruction is issued by the user through the operation of the operation unit 13 (step S16). In a case where the main control unit 50 determines that the imaging instruction is not issued (step S16: NO), the process returns to step S11. Meanwhile, in a case where the main control unit 50 determines that the imaging instruction is issued (step S16: YES), the main control unit 50 causes the imaging control unit 51 to execute still image capturing (step S17).

As described above, in the MF mode, the user can accurately focus on a desired subject through the manual focus while checking the distance to the object by referring to the distance map 72.

Figure 15:
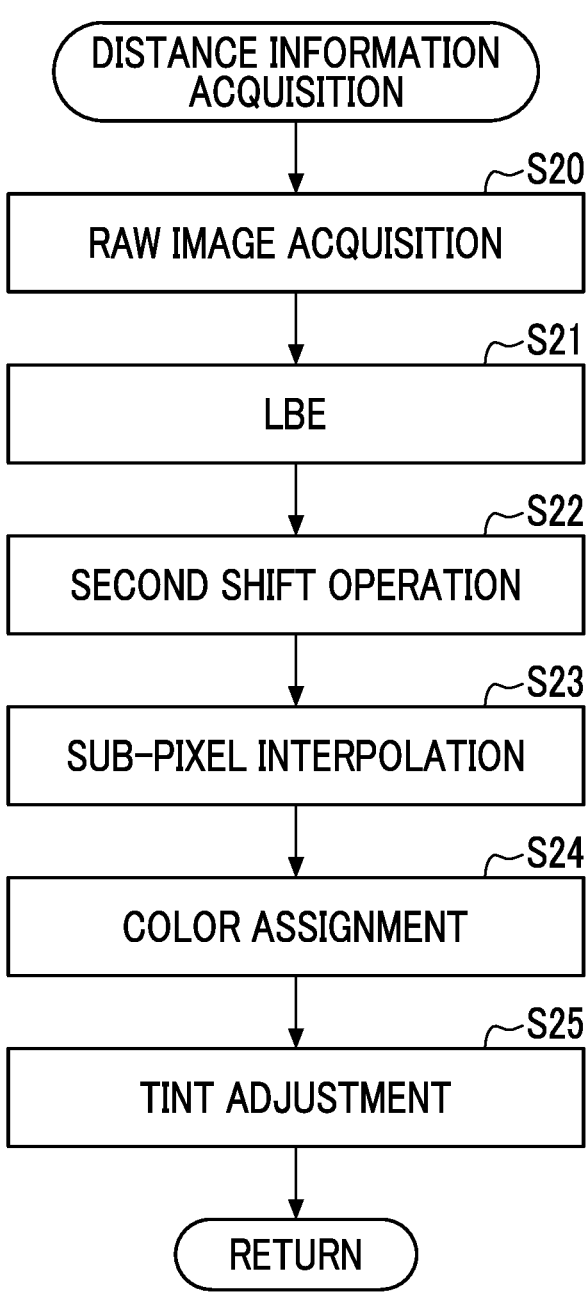
FIG. 15 is a flowchart showing an example of the distance information acquisition processing.

FIG. 15 is a flowchart showing an example of the distance information acquisition processing (step S14) shown in FIG. 14. The distance information acquisition unit 54 acquires the RAW image RD output from the imaging sensor 20 (step S20). Next, the distance information acquisition unit 54 acquires the first signal S1 and the second signal S2 described above from the RAW image RD and encodes the first signal S1 and the second signal S2 by using the LBE method (step S21). As a result, the first phase difference information D1 and the second phase difference information D2 are generated.

The distance information acquisition unit 54 performs the above-described second shift operation by using the first phase difference information D1 and the second phase difference information D2 (step S22). The distance information acquisition unit 54 performs the above-described sub-pixel interpolation processing based on the plurality of difference maps 70 obtained through the second shift operation (step S23). The distance information acquisition unit 54 performs the above-described color assignment processing of assigning a color corresponding to the shift amount δ obtained as a result of the sub-pixel interpolation processing (step S24). Then, the distance information acquisition unit 54 performs the tint adjustment on the distance map 72 generated as a result of the color assignment processing (step S25).

In the distance information acquisition processing of the present disclosure, a region from which the distance information is acquired is the entire imaging area 62 and is larger than the AF area 60 which is a region from which the focusing information is acquired through the focusing information acquisition processing. However, the shift range in the second shift operation used in the distance information acquisition processing is smaller than the shift range in the first shift operation used in the focusing information acquisition processing, so that rapid acquisition of the distance information is possible.

In addition, in the distance information acquisition processing of the present disclosure, the first phase difference information D1 and the second phase difference information D2 are generated by encoding the first signal S1 and the second signal S2, so that it is robust against the difference in sensitivity between the phase difference pixel P1 and the phase difference pixel P2. Therefore, it is not necessary to perform sensitivity ratio correction on the first phase difference information D1 and the second phase difference information D2.

Further, in the distance information acquisition processing of the present disclosure, the first signal S1 and the second signal S2 are encoded by using the LBE method, so that each pixel of the first phase difference information D1 and the second phase difference information D2 is represented by a multi-bit LBP. Therefore, the correlation operation can be performed with high accuracy.

In the above-described embodiment, the phase difference image may be generated based on the signal of the row in which the phase difference pixel P1 and the phase difference pixel P2 are arranged, and the first phase difference information D1 and the second phase difference information D2 may be generated based on the generated phase difference image.

Further, in the above-described embodiment, the distance information acquisition unit 54 acquires the distance information for the entire imaging area 62, but a region from which the distance information is acquired need not be the entire imaging area 62. For example, the distance information acquisition unit 54 may detect an image structure of the subject (for example, a contour, a characteristic structure of the subject, a difference in contrast, or the like) to acquire the distance information about a region within the detected characteristic image structure. That is, by detecting the characteristic image structure and not performing the second shift operation on a region outside the detected image structure, it is possible to increase a processing speed. A representative example of the characteristic image structure is the contour of the subject.

In the above-described embodiment, as the hardware structure of the control unit using the processor 40 as an example, various processors to be described below can be used. The various processors include, in addition to a CPU, which is a general-purpose processor that functions by executing software (programs), a processor which has a changeable circuit configuration after manufacturing, such as an FPGA. The FPGA includes a dedicated electrical circuit which is a processor having a dedicated circuit configuration designed to execute specific processing, such as PLD or ASIC.

The control unit may be composed of one of these various processors or may be composed of a combination of two or more of the processors of the same type or different types (for example, a combination of a plurality of FPGAs or a combination of a CPU and an FPGA). Alternatively, a plurality of control units may be configured with one processor.

A plurality of examples in which a plurality of control units are configured with one processor are conceivable. As a first example, as represented by a computer such as a client and a server, there is an aspect in which one or more CPUs and software are combined to configure one processor and the processor functions as a plurality of control units. As a second example, as represented by system on chip (SOC), there is an aspect in which a processor that implements the functions of the whole system which includes a plurality of control units with one IC chip is used. In this way, the control unit can be configured by using one or more of the above-described various processors as the hardware structure.

Additionally, as the hardware structure of these various processors, more specifically, it is possible to use an electrical circuit in which circuit elements such as semiconductor elements are combined.

The contents described and shown above are detailed descriptions of parts related to the technology of the present disclosure and are merely an example of the technology of the present disclosure. For example, the above description related to configurations, functions, actions, and effects is description related to an example of the configurations, functions, actions, and effects of the parts related to the technology of the present disclosure. Therefore, it goes without saying that unnecessary parts may be deleted, new elements may be added, or replacements may be made for the contents described and shown above within the scope that does not depart from the gist of the technology of the present disclosure. Additionally, in order to avoid confusion and to facilitate understanding of the parts related to the technology of the present disclosure, description related to common technical knowledge and the like that do not require particular description to enable implementation of the technology of the present disclosure is omitted from the contents described and shown above.

All documents, patent applications, and technical standards described in the present specification are incorporated by reference into the present specification to the same extent as in a case in which the individual documents, patent applications, and technical standards were specifically and individually stated to be incorporated by reference.

What is claimed is:

1. An imaging apparatus comprising:
an image sensor that has a phase difference pixel group including a first phase difference pixel group and a second phase difference pixel group; and
at least one processor,
wherein the processor is configured to:
execute a first mode that is a mode related to focusing on a subject and in which focusing information of a first region is acquired by performing a first shift operation on first phase difference information, which is obtained from the first phase difference pixel group within the first region, and second phase difference information, which is obtained from the second phase difference pixel group within the first region; and
execute a second mode that is a mode different from the first mode and in which distance information of a second region larger than the first region is acquired by performing a second shift operation on the first phase difference information and the second phase difference information corresponding to the second region, and
a shift range in the second shift operation is smaller than a shift range in the first shift operation.

2. The imaging apparatus according to claim 1, wherein the second region includes a region of the subject that is in focus.

3. The imaging apparatus according to claim 1, wherein the second shift operation has a larger information amount of the first phase difference information and the second phase difference information than the first shift operation.

4. The imaging apparatus according to claim 3, wherein the processor is configured to, in the second mode:

acquire the first phase difference information and the second phase difference information by encoding signals obtained from the first phase difference pixel group and the second phase difference pixel group.

5. The imaging apparatus according to claim 4, wherein the processor is configured to, in the second mode:

convert the signal obtained from the first phase difference pixel group into the first phase difference information by using a local binary encoding method;

convert the signal obtained from the second phase difference pixel group into the second phase difference information by using the local binary encoding method; and perform a bitwise operation on the first phase difference information and the second phase difference information as the second shift operation to acquire the distance information including a plurality of pixels, which is represented by a result of the bitwise operation.

6. The imaging apparatus according to claim 4, wherein the processor is configured to, in the second mode:

generate a phase difference image based on the signals obtained from the first phase difference pixel group and the second phase difference pixel group.

7. The imaging apparatus according to claim 5, wherein the processor is configured to, in the second mode:

generate the first phase difference information and the second phase difference information based on the signals obtained from the first phase difference pixel group and the second phase difference pixel group; and generate a distance map that represents a distance to be visually identifiable by a user, based on the result of the bitwise operation.

8. The imaging apparatus according to claim 1, wherein the processor is configured to, in the second mode:

control the second shift operation based on an image structure of the subject.

9. The imaging apparatus according to claim 8, wherein the image structure of the subject is a contour of the subject.

10. A drive method of an imaging apparatus including an image sensor that has a phase difference pixel group including a first phase difference pixel group and a second phase difference pixel group, the drive method comprising:

executing a first mode that is a mode related to focusing on a subject and in which focusing information of a first region is acquired by performing a first shift operation on first phase difference information, which is obtained from the first phase difference pixel group within the first region, and second phase difference information, which is obtained from the second phase difference pixel group within the first region; and executing a second mode that is a mode different from the first mode and in which distance information of a second region larger than the first region is acquired by performing a second shift operation on the first phase difference information and the second phase difference information corresponding to the second region, wherein a shift range in the second shift operation is smaller than a shift range in the first shift operation.

11. A non-transitory computer-readable storage medium storing a program for operating an imaging apparatus including an image sensor that has a phase difference pixel group including a first phase difference pixel group and a second phase difference pixel group, the program configured to:

cause the imaging apparatus to execute a first mode that is a mode related to focusing on a subject and in which focusing information of a first region is acquired by performing a first shift operation on first phase difference information, which is obtained from the first phase difference pixel group within the first region, and second phase difference information, which is obtained from the second phase difference pixel group within the first region; and cause the imaging apparatus to execute a second mode that is a mode different from the first mode and in which distance information of a second region larger than the first region is acquired by performing a second shift operation on the first phase difference information and the second phase difference information corresponding to the second region, wherein a shift range in the second shift operation is smaller than a shift range in the first shift operation.

* * * * *